3,399,033
CRYSTALLIZATION OF TUNGSTEN DISULFIDE FROM MOLTEN SLAGS
Joseph W. Town, Albany, Oreg., assignor to the United States of America as represented by the Secretary of the Interior
No Drawing. Filed Aug. 1, 1966, Ser. No. 569,795
10 Claims. (Cl. 23—134)

ABSTRACT OF THE DISCLOSURE

Crystalline tungsten disulfide is produced by smelting a mixture of sulfide-bearing material and tungsten-bearing material in the presence of silica and lime.

---

This invention relates to the recovery of tungsten from tungsten-bearing materials.

Presently employed commercial processes for the recovery of tungsten from ores involve gravity separation or flotation techniques. However, many tungsten ores are difficult to treat in this manner and the product usually recovered (e.g., scheelite, $CaWO_4$) may contain only 30 percent of the tungsten originally present in the ore. Pyrite (FeS) is the most common interfering mineral in such processes.

It has now been discovered that tungsten can be recovered from tungsten-bearing materials as tungsten disulfide which is readily prepared by smelting tungsten-bearing materials with a sulfide-bearing material in the presence of a calcium oxide-silicon dioxide fluxing agent. The fluxing agent acts to free the sulfur from the sulfide-bearing material, so that it can react with the tungsten-bearing material to form tungsten disulfide. The molten mass when cooled contains crystalline tungsten disulfide which can be recovered therefrom in substantially pure form by conventional sulfide flotation techniques. Although the tungsten disulfide product has several valuable commercial uses, it can be conventionally reduced to elemental tungsten.

It is therefore an object of this invention to provide a process for more selectively recovering tungsten from difficult-to-treat tungsten-bearing ores. A further object is to selectively recover tungsten from tungsten-bearing materials such as tungsten compounds, minerals, ores, ore concentrates and mixtures thereof. Another object is to employ sulfide-bearing materials, which normally interfere with tungsten recovery processes, as agents for securing a high recovery of tungsten.

Other objects and advantages of this invention will be obvious from the detailed description of the process appearing in the specification taken in conjunction with the following flow diagram in which the overall tungsten recovery procedure is shown below.

In the process of the present invention a tungsten-bearing material, such as a mineral, an ore, or ore concentrate containing tungsten or a tungstic oxide is mixed with sufficient sulfide-bearing material, such as pyrite ($FeS_2$), pyrrhotite (FeS), oldhamite (CaS), other sulfides, or mixtures thereof, to convert all the tungsten present to the disulfide. Added to this mixture as fluxing or slagging agents are calcium oxide (usually as lime) and silicon dioxide (usually as silica). The total charge is then heated to the melting point of the materials. During the melting,

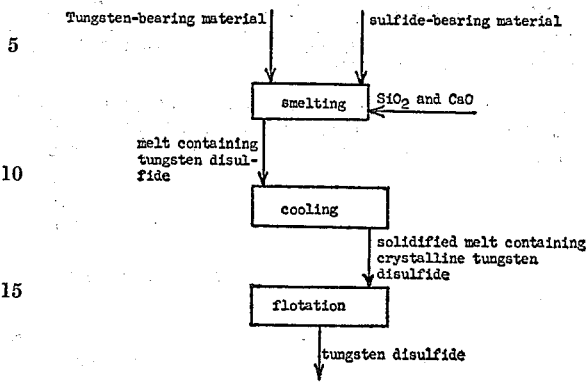

silicon dioxide basically reacts with the elements (other than tungsten and sulfur) present in the tungsten- and sulfide-bearing materials to form slags whereby the tungsten and sulfur are free to react with one another; and the silicon dioxide also reacts with the CaO to form a calcium silicate slag. An exemplary basic reaction between silica, tungsten- and sulfide-bearing materials is as follows:

$$3CaWO_4 + 7FeS + 10SiO_2 \rightarrow 3CaSiO_3$$
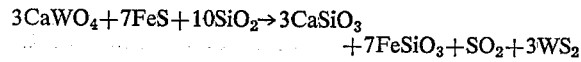
$$+ 7FeSiO_3 + SO_2 + 3WS_2$$

The $SiO_2$-CaO slag reaction enables the basic reaction to proceed to the right. $SiO_2$ should therefore be added in amounts sufficient to release substantially all the tungsten and sulfur present and to react with the CaO. When the $SiO_2$ and CaO form an alpha calcium silicate slag, the most favorable basic reaction is achieved. Such a slag can normally be formed if the CaO and the $SiO_2$ (above that stoichiometrically required for the basic reaction) are each added in amounts equal to at least about 2.5 percent by weight of the total charge.

Operating temperatures during melting depend on the melting point of the particular materials present. After fusion, slag can be removed from the molten mass, and the remaining molten product cooled to solidification, or the entire molten mass can be cooled. Solidified melt containing crystalline tungsten disulfide is then ground to minus 100–200 mesh for flotation of the sulfide with a conventional sulfide collector and frother. Tungsten disulfide concentrate recovered from the flotation is repulped and floated a number of times (usually twice) to produce the desired purity in the disulfide concentrate.

Among the tungsten-bearing materials that can be treated by the process of this invention are tungsten oxide ($WO_2$ or $WO_3$), scheelite ($CaWO_4$), wolframite

[(Fe,Mn)WO_4]

hubnerite and other tungstic oxide materials.

Many sulfide-bearing materials can be employed including FeNiS, CuS, $Cu_2S$, ZnS, PbS, etc. Cost is the main prohibiting factor with regard to the particular material employed.

The following examples illustrate specific ways in which the process can be carried out.

EXAMPLE 1

The following charges using a scheelite ore concentrate were smelted in an electric furnace at about 1450° C. for one hour:

| Test No. | Basic Reactants, grams | | | | | Calcium silicate slag reactants, grams | | Temperature, ° C. |
|---|---|---|---|---|---|---|---|---|
| | Scheelite concentrate [1] | FeS | FeS$_2$ | CaS | SiO$_2$ | CaO | SiO$_2$ | |
| 1 | 50 | 36 | | | 35 | 10 | 10 | 1,450 |
| 2 | 50 | 36 | | | 42 | 20 | 20 | 1,450 |
| 3 | 50 | 44 | | | 42 | 10 | 10 | 1,450 |
| 4 | 50 | 40 | | | 49 | 10 | 10 | 1,450 |
| 5 | 50 | | | 36 | 35 | 20 | 5 | 1,470 |
| 6 | 50 | | 30 | | 35 | 20 | 5 | 1,400–1,500 |
| 7 | 50 | | 36 | | 35 | 20 | 20 | 1,400–1,500 |
| 8 | 50 | | 36 | | 35 | 15 | 20 | 1,400–1,500 |
| 9 | 50 | | 29 | | 35 | 20 | 13 | 1,450 |

[1] Scheelite concentrate contained about 50% W or about 77% CaWO$_4$ with some heavy mineral impurities (garnet, ilmenite, magnetite, pyrite).

After cooling the solidified melts were then ground to minus 200 mesh in a ball mill, pulped at 20 percent solids, and the tungsten disulfide floated with a sodium secondary butyl xanthate collector (used in amounts ranging from 0.2 to 1.0 pound per ton) and a water soluble polypropylene methyl glycol ether frothing agent (used in amounts ranging from 0.01 to 0.1 pound per ton of solid product). X-ray analyses of the tungsten disulfide crystals showed essentially 100 percent WS$_2$.

EXAMPLE 2

A charge consisting of hubnerite concentrate (MnWO$_4$), pyrrhotite (FeS) and fluxing agents were smelted in a globar furnace at 1450° C. for one hour. The charge consisted of the following:

| | Grams |
|---|---|
| Basic reactants: | |
| Hubnerite concentrate | 50 |
| Pyrrhotite | 44 |
| Quartz (SiO$_2$) | 33 |
| Calcium silicate slag reactants: | |
| Quartz (SiO$_2$) | 30 |
| Lime (CaO) | 20 |

After cooling, the solidified melt showed very good tungsten disulfide crystals, and X-ray analysis showed the crystals to be essentially pure WS$_2$. Concentration methods were similar to Example 1.

EXAMPLE 3

Charges of tungsten and tungstic oxide were smelted in a split graphite furnace at from 1500° to 1660° C. for one hour with the following weights of reactants and fluxing agents used:

| Test No. | Basic Reactants, grams | | | | Calcium silicate slag reactants, grams | | Temperature, ° C. |
|---|---|---|---|---|---|---|---|
| | W | WO$_3$ | CaS | SiO$_3$ | CaO | SiO$_2$ | |
| 1 | | 25 | 30 | 15 | 20 | 15 | 1,650 |
| 2 | | 25 | 30 | 15 | 30 | 15 | 1,650 |
| 3 | | 25 | 30 | 15 | 30 | 40 | 1,650 |
| 4 | 25 | | 30 | 16 | 30 | 39 | 1,700 |
| 5 | 25 | | 30 | 16 | 30 | 39 | 1,500 |

Solidified melt was treated in a similar manner to that shown in Example 1. X-ray analyses showed the major portion of the tungsten to be in the form of tungsten disulfide.

Experimental studies have shown that tungstic oxide materials will not react with a sulfide-bearing material in the molten state in the absence of either SiO$_2$ or CaO. Test results for maximum conversion of the tungsten to tungsten disulfide indicated that a slag of alpha-calcium silicate gave the best results.

A high-grade tungsten disulfide meeting commercial requirements is produced by the process of this invention. It is useful as a lubricant or a hydrogenation catalyst for carbonaceous materials. Further since it can be readily reduced to elemental metal, low grade ores, now considered non-amenable to current processing techniques, would provide a new raw material source for elemental tungsten.

Although the particular process is well adapted to carry out the objects of the present invention, it is to be understood that various modifications and changes may be made all coming within the scope of the following claims.

What is claimed is:

1. A process for producing tungsten disulfide from a tungsten-bearing material comprising
    (a) smelting a mixture of sulfide-bearing material and said tungsten-bearing material in the presence of silicon dioxide and calcium oxide, said silicon dioxide being present in an amount sufficient to release tungsten and sulfur from said materials and sufficient to react with said calcium oxide to form a calcium silicate slag whereby molten slag and molten product containing tungsten disulfide are formed;
    (b) cooling said molten product to form a solid product containing crystalline tungsten disulfide.

2. The process of claim 1 further comprising recovering substantially pure tungsten disulfide from said solid product by sulfide flotation.

3. The process of claim 1 wherein said tungsten-bearing material is selected from the group consisting of tungsten-bearing compounds, minerals, ores, ore concentrates and mixtures thereof.

4. The process of claim 1 wherein said sulfide-bearing material is selected from the group consisting of pyrite, pyrrhotite, oldhamite and mixtures thereof.

5. The process of claim 1 wherein said tungsten-bearing material is selected from the group consisting of WO$_2$, WO$_3$, scheelite, wolframite, hubnerite and mixtures thereof.

6. The process of claim 1 wherein said sulfide-bearing material is present in amounts sufficient to convert substantially all the tungsten in said tungsten-bearing material to tungsten disulfide.

7. The process of claim 1 wherein said silicon dioxide and calcium oxide are each present in the total charge to said smelting step in an amount sufficient to form an alpha calcium silicate slag.

8. The process of claim 3 wherein said silicon dioxide and calcium oxide are each present in the total charge to said smelting step in an amount sufficient to form an alpha calcium silicate slag.

9. The process of claim 3 wherein said sulfide-bearing material is selected from the group consisting of pyrite, pyrrhotite, oldhamite and mixtures thereof.

10. The process of claim 9 wherein said silicon dioxide and calcium oxide are each present in the total charge to said smelting step in an amount sufficient to form an alpha calcium silicate slag.

References Cited

UNITED STATES PATENTS

| | | | |
|---|---|---|---|
| 1,235,953 | 8/1917 | Bacon | 23—181 |
| 2,120,485 | 6/1938 | Clemmer et al. | 23—15 |
| 2,769,691 | 11/1956 | Achille | 23—181 |
| 3,256,058 | 6/1966 | Burwell | 23—134 X |

FOREIGN PATENTS

| | | |
|---|---|---|
| 1,155,103 | 10/1963 | Germany. |
| 122,051 | 1/1919 | Great Britain. |
| 484,329 | 5/1938 | Great Britain. |
| 630,042 | 10/1949 | Great Britain. |

EDWARD J. MEROS, *Primary Examiner.*

G. O. PETERS, *Assistant Examiner.*